E. M. STEWART.
PNEUMATIC TIRE.
APPLICATION FILED NOV. 28, 1914.
1,177,549.
Patented Mar. 28, 1916.
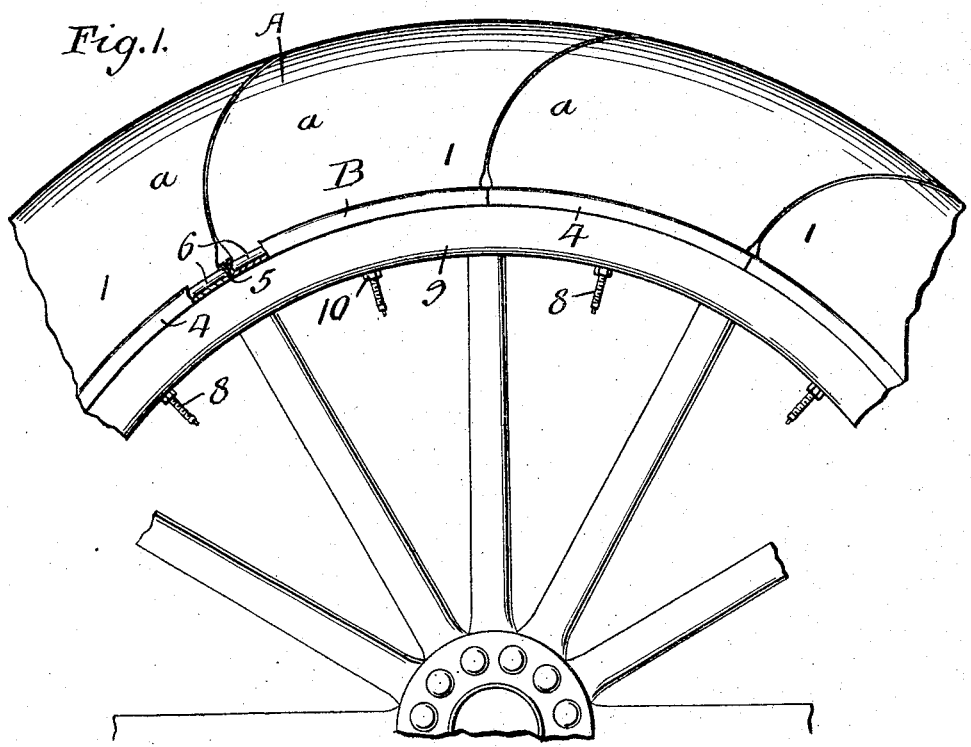
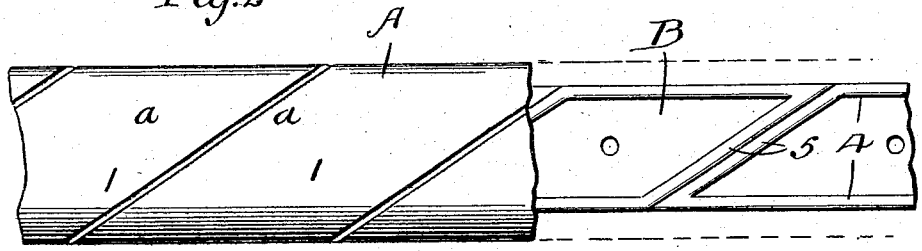
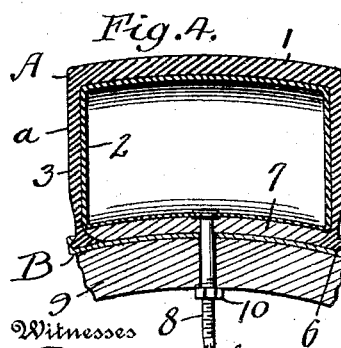
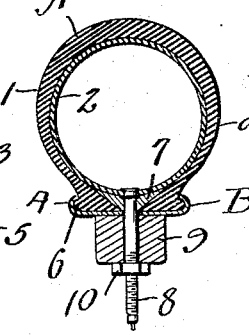
Inventor
E. M. Stewart,
By Victor J. Evans
Attorney
Witnesses

UNITED STATES PATENT OFFICE.

EDGAR M. STEWART, OF MONTPELIER, IDAHO.

PNEUMATIC TIRE.

1,177,549.  Specification of Letters Patent.  Patented Mar. 28, 1916.

Application filed November 28, 1914. Serial No. 874,441.

*To all whom it may concern:*

Be it known that I, EDGAR M. STEWART, a citizen of the United States, residing at Montpelier, in the county of Bear Lake and State of Idaho, have invented new and useful Improvements in Pneumatic Tires, of which the following is a specification.

This invention relates to pneumatic tires, the object in view being to produce a tire composed of an annular series of independent sections each independently attached or fastened to the rim of the wheel and each section being independently inflated so that in case of a puncture or blow out, only a single section of the tire will be affected, enabling the car to proceed on its way without repairing the blow out or puncture until a suitable repair place is reached or the operator has time to make a repair on the road.

With the above and other objects in view, the invention consists in the novel construction, combination and arrangement of parts, as herein described, illustrated and claimed.

In the accompanying drawings: Figure 1 is a fragmentary side elevation of a vehicle wheel showing the tire of this invention applied thereto. Fig. 2 is a fragmentary plan view of the tire partly broken away to show the construction of the clencher rim. Fig. 3 is a vertical cross section through the tire and rim. Fig. 4 is a vertical longitudinal section including one of the tire sections.

The tire contemplated in this invention is designated as a whole at A and is composed of an annular series of sections $a$ each of which is independent of the other.

Each section $a$ comprises an outer casing 1 and an inner tube 2. The outer casing 1 is closed around the side walls thereof, the same as an ordinary pneumatic tire and is also provided with closed end walls 3 which are slightly separated from each other when all of the sections are combined and applied to the wheel rim as shown in Fig. 1. The end walls 3 are on a line oblique to the length of the tire as a whole, the object being to avoid a transverse line of division between the sections of the tire for the purpose of giving a more even bearing along the adjacent edges of the sections and correspondingly increasing the life and durability of the complete tire. Furthermore, the gap caused by the deflation of any one of the sections of the tire is minimized between the sections lying at opposite sides of the deflated section, resulting in extending the supporting area adjacent to said deflated section so as to prevent the rim of the wheel from striking against the ground in case the vehicle continues in operation. Each inner tube section 2 is also complete in itself and fits its respective outer section 1.

The rim designated generally at B comprises side clencher flanges 4 and in addition thereto other clencher flanges 5 which extend at an angle to the side flanges 4 and obliquely across the rim as clearly indicated in the broken away portion of Fig. 2. In this way four clencher flanges are provided on each rim section to receive a corresponding number of clencher beads 6 on each of the tire sections $a$.

The means for holding the tire sections in place independently of each other and so that any one section may be removed from the wheel without disturbing the remaining sections consists of a clamping plate 7 as shown in Fig. 3, said clamping plate having a hole through which the metal valve tube 8 passes. The plate 7 is of such size and shape as to engage the inner faces of all of the marginal clencher portions of the outer case, preventing the beads 6 from moving out of the rim flanges when subjected to lateral thrusts. The valve tube 8 is of sufficient length to extend through the felly 9 of the wheel and is threaded to receive a nut 10, enabling the clamping plate 7 to be drawn tightly against the marginal portions of the outer casing 1. The valve tube 8 permits the inner tube 2 to be inflated and also has the function of holding the clamping plate 7 in a fixed position after the nut 10 has been tightened. Should any section of the tire be subjected to a puncture or blow out, it is only necessary to remove the nut 10 and push the tube 8 outwardly through the felly 9 and rim B. The plate 7 is free to move away from contact with the marginal portions of the outer casing 1 and this enables the clencher beads of the outer casing to be removed from the clencher flanges of the rim. The deflation of one section will not interfere with running the wheel as in the preferred embodiment of the invention the sections will be small enough to avoid leaving a gap of sufficient length between the unimpaired sections to prevent the rim from coming in contact with the ground. In case a puncture or blow out is repaired on the road, it will only be necessary to inflate one section of the tire instead of the whole tire. The invention also adds greatly to the safety of the occupants of the machine for the reason that in case of a blow out or puncture while traveling at high speed, only one section of the tire will be affected and therefore the remainder of the tire will be securely held on the rim of the wheel.

What I claim is:—

A pneumatic tire comprising an annular series of independent sections each of which embodies an outer case, and an inner tube, the outer case being of the clencher type, a valve tube attached to the inner tube, and a clamping plate between the inner tube and beaded margins of the outer case and having said valve tube passed therethrough, in combination with a wheel rim embodying side clencher flanges and other clencher flanges extending at an angle to said side flanges, the outer case sections being provided with clencher beads corresponding in number and arrangement with said clencher flanges.

In testimony whereof I affix my signature in presence of two witnesses.

EDGAR M. STEWART.

Witnesses:
J. W. DOWNING,
H. W. FINDLEY.

Copies of this patent may be obtained for five cents each, by addressing the "Commissioner of Patents, Washington, D. C."